No. 747,910. PATENTED DEC. 22, 1903.
H. A. GAGE.
DEVICE FOR PRODUCING OPTICAL ILLUSIONS.
APPLICATION FILED MAR. 30, 1903.
NO MODEL.

Witnesses:
G. A. Pennington
F. H. Gibbs

Inventor:
Harry A. Gage,
by Bakewell + Cornwall
Attys.

No. 747,910. Patented December 22, 1903.

UNITED STATES PATENT OFFICE.

HARRY A. GAGE, OF ST. LOUIS, MISSOURI, ASSIGNOR TO X-RAY NOVELTY CO., OF PHŒNIX, ARIZONA TERRITORY, A CORPORATION OF ARIZONA TERRITORY.

DEVICE FOR PRODUCING OPTICAL ILLUSIONS.

SPECIFICATION forming part of Letters Patent No. 747,910, dated December 22, 1903.

Application filed March 30, 1903. Serial No. 150,208. (No model.)

*To all whom it may concern:*

Be it known that I, HARRY A. GAGE, a citizen of the United States, residing at St. Louis, Missouri, have invented a certain new and useful Improvement in Devices for Producing an Optical Illusion, of which the following is a full, clear, and exact description, such as will enable others skilled in the art to which it appertains to make and use the same, reference being had to the accompanying drawings, forming part of this specification, in which—

Figure 1:
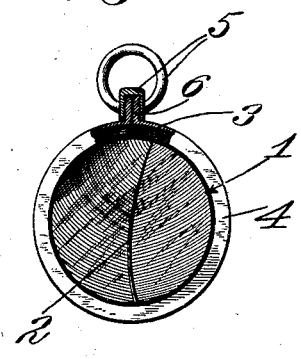
Figure 2:
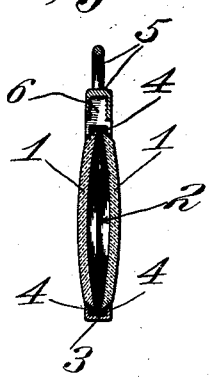
Figure 3:
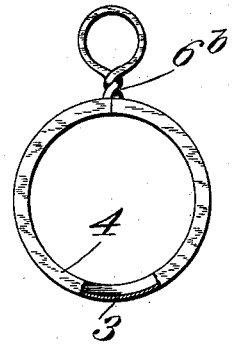

Figure 1 is a side elevational view, partly broken away. Fig. 2 is a vertical sectional view taken centrally of Fig. 1. Fig. 3 is a modified form of holder wherein the handle portion is formed by twisting an extension from the channeled ring; and Fig. 4 is a further modification in which the handle is connected to a split ring, which may or may not be twisted, as desired.

This invention relates to new and useful devices for producing an optical illusion, and relates especially to details of construction, formation, and arrangement of the means employed for holding the feather used for producing the desired effect.

Referring to the drawings, 1 indicates the concavo-convex disks of glass preferably, though any suitable transparent material may be substituted therefor, if desired. The disks are placed side by side with their concave faces inwardly disposed, between which is held a feather 2, with the spline thereof centrally disposed with relation to the disks 1 and the barbs or rami of the feather slightly separated, so that it is possible for the observer to have direct and uninterrupted sight of the object being viewed through the spaces between the barbs. The disks 1 and feather 2 are held in position between the inwardly-disposed flanges 4 of the circular holding member 3, the flanges being substantially parallel and so arranged with relation to the concavo-convex disks 1 that when the member 3 is closed, as indicated in Figs. 1, 2, and 3, the flanges 4 will abut against said disks 1 and in closing ride upwardly on the convex side of said disks, thereby firmly gripping the same and forcing them together, so that their meeting edges will securely grasp and firmly hold between them the spline and barbs of the feather 2, which is placed therebetween, so as to prevent any possible displacement thereof, which might occur if it were not for the circumferential grip provided by the meeting faces of the disks. It is quite essential to the success of the scheme of illusion that the barbs of the feather be slightly separated and that the central splines shall be so disposed as to extend centrally of the line of vision, and to accomplish this separation of the barbs air is forced through the feather before it is placed between the disks, whereby a separation, such as indicated in Fig. 1, will result. The essential requisite in a device of this character—to be used as a watch-charm, pocket-piece, or ornament—is that the transparent disks shall be firmly held in position by some means which will cause them to serve as a clamp for locking the feather in fixed position, and the channels 4, coöperating with the concavo-convex disks or lenses shown, have been found best adapted to serve the required purpose.

Figure 4:
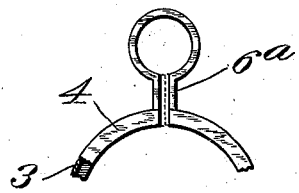

Various forms of holder may be used—as, for instance, the one shown in Fig. 1, wherein the channeled ring is provided with integral screw-threaded studs 6, upon which are screwed the handle 5—or, if desired, the handle portion may be formed as shown in Fig. 3, wherein said portion is twisted, as shown at $6^b$, to lock the channel-ring in closed position, or, as shown in Fig. 4, wherein the split ring is provided with the handle portion $6^a$, which may be drawn together by wires or any suitable compression-tool to accomplish the same result, though the form shown in Figs. 1 and 3 are preferable, because of the more secure locking of the parts in operative position.

I am aware that minor changes in the construction, arrangement, and combination of the several parts of my device can be made and substituted for those herein shown and described without in the least departing from the nature and principle of my invention.

Having thus described my invention, what

I claim as new, and desire to secure by Letters Patent, is—

In a device for producing an optical illusion, a holder comprising a band of metal substantially circular for a portion of its length, having integral inwardly-disposed flanges at right angles thereto and having an integral portion without flanges extending therefrom adapted to form a handle therefor, in combination with a pair of concavo-convex disks located between the flanges of said band with the convexity thereof so proportioned that the closing of said flanged band endwise will press the said concavo disks laterally together at their edge portions, and a feather which is held between the edge portions, only, of said disks; all combined and arranged substantially as shown and described.

In testimony whereof I hereunto affix my signature, in the presence of two witnesses, this 28th day of March, 1903.

HARRY A. GAGE.

Witnesses:
GEORGE BAKEWELL,
F. H. GIBBS.